(12) United States Patent
Nishio et al.

(10) Patent No.: US 8,714,103 B2
(45) Date of Patent: May 6, 2014

(54) DOUBLE SIDE COATING DEVICE

(75) Inventors: Tsutomu Nishio, Osaka (JP); Takao Tokumoto, Osaka (JP)

(73) Assignee: Chugai Ro Co., Ltd., Osaka (JP)

( * ) Notice: Subject to any disclaimer, the term of this patent is extended or adjusted under 35 U.S.C. 154(b) by 652 days.

(21) Appl. No.: 13/007,087

(22) Filed: Jan. 14, 2011

(65) Prior Publication Data

US 2011/0174215 A1  Jul. 21, 2011

(30) Foreign Application Priority Data

Jan. 20, 2010 (JP) ................ 2010-010077

(51) Int. Cl.
*B05C 5/02* (2006.01)
*B05C 9/04* (2006.01)

(52) U.S. Cl.
CPC ........... *B05C 5/0254* (2013.01); *B05C 5/0283* (2013.01); *B05C 9/04* (2013.01)
USPC .......................................................... 118/316

(58) Field of Classification Search
CPC ........ B05C 5/0254; B05C 5/0283; B05C 9/04
USPC .......... 118/226, 227, 255, 316; 427/209, 211
See application file for complete search history.

(56) References Cited

U.S. PATENT DOCUMENTS 4,064,288 A * 12/1977 Shah et al. ..................... 427/58
4,455,327 A    6/1984 Yoshida et al.

FOREIGN PATENT DOCUMENTS

| EP | 0 366 481 A2 | 5/1990 |
|---|---|---|
| EP | 0 366 481 A3 | 5/1990 |
| JP | 51 38737 | 10/1976 |
| JP | 2-214564 A | 8/1990 |
| JP | 3-72976 A | 3/1991 |
| JP | 3 130461 A | 6/1991 |
| JP | 7-185436 A | 7/1995 |
| JP | 10 076206 A | 3/1998 |
| JP | 10-216603 A | 8/1998 |
| JP | 2001 327906 A | 11/2001 |
| JP | 3275202 B2 | 2/2002 |
| JP | 2008-284528 A | 11/2008 |

OTHER PUBLICATIONS

European Search Report dated Mar. 16, 2011.

* cited by examiner

*Primary Examiner* — Laura Edwards
(74) *Attorney, Agent, or Firm* — Birch, Stewart, Kolasch & Birch, LLP

(57) ABSTRACT

It is provided a double side coating device which can maintain a thickness of a coated film in constant. The double side coating device has a back up roller supporting a web material, a first coating head that is placed opposite to the back up roller and that applies a coating material onto a first surface of the web material, a suction roller that is provided with a plurality of supporting portions which projects annularly so as to contact with a uncoated portion of the first surface of the web material and on circumference of which suction holes are opened to suck atmosphere, and a second coating head that is placed opposite to the suction roller and that coats second surface of the web material with a coating material.

4 Claims, 7 Drawing Sheets

DOUBLE SIDE COATING DEVICE

FIELD OF THE INVENTION

The present invention relates to a double side coating device for applying coating material to both surfaces of a web material.

DESCRIPTION OF THE RELATED ART

In case that both surface of a web material should be coated, generally, the web material is coated on one surface with coating material and then dried to be rewound, with a one side coating device. The rewound web material is put again in the one side coating device to be applied with coating material on the other surface.

With increasing of needs for electric vehicle and the like, density growth and price reduction of secondary battery are strongly required. In production of the secondary battery cell, a coating device that can apply active material to both surfaces of a metallic foil electrode is required.

Generally, in a coating device applying coating material with a die head, a thickness of a coated film is maintained in constant by arranging the die head opposing to a web material wound around a back up roller to keep the gap between the web material and the die head in constant. To provide two die heads that respectively coat the web material wound around the back up rollers are provided to allow coating on both surfaces of the web material, it is required to dry the coating material applied by the first die head before the web material is wound around the second back up roller. Accordingly, two dryers are required and therefore the facility gets longer and the cost is increased.

In JP-A-H3-72976 and JP-A-H10-216603, there are described coating devices with two die head arranged so as to nip a web material. However, since the coating devices can not hold the web material when coating, the web material oscillate between the die heads to vary gaps between the die heads and the web material, and therefore a variance in thickness of the coated film is caused.

In JP-A-2008-284528, there is described an invention with a roller arranged just before a die head to nip the web material and a roller arranged just after the die head to nip margin portions where are not coated at both side of the web material to apply a tension. However, even in this coating device, the web material is not supported at the moment of being coated, and therefore it is difficult to absolutely prevent the oscillation of the web material.

In JP-A-H2-214564, there is described an invention that supports a coated surface of a web material in an air floating condition by a roller ejecting air through a plurality of small holes provided on the surface of the roller, to coat other side of the web material with a die head placed opposite to the air floating roller. Also in this case, it is difficult to keep a thickness of the air layer supporting the web material, and therefore the gap between the die head and the web material varies so as to cause a variance in thickness of the coated film.

In JP-A-H7-185436, there is described an invention that supports a coated face of a web material by a grooved roller rotating in counter direction to the web material, to coat other side of the web material with a die head placed opposite to the grooved roller. In this invention, coating material applied on the portions contacting with projections between the grooves are pushed out to the portion inside the grooves at the moment that the web material is supported by the grooved roller. Therefore, this invention can be applied in only case that the coating material can recover the uniform thickness of the coated film due to a physicality of the coating material when the web material gets away from the grooved roller.

In view of the above problem, an object of the present invention is to provide a double side coating device which can maintain a thickness of a coated film in constant.

SUMMARY OF THE INVENTION

In order to achieve the above object, a double side coating device according to the present invention has a back up roller supporting a web material, a first coating head that is placed opposite to the back up roller and that applies a coating material onto a first surface of the web material, a suction roller that is provided with a plurality of supporting portions which projects annularly so as to contact with an uncoated portion of the first surface of the web material and on circumference of which suction holes are opened to suck atmosphere, and a second coating head that is placed opposite to the suction roller and that coats second surface of the web material with a coating material.

In accordance with this configuration, when the second coating head coats the second surface of the web material, the supporting portion sucks a uncoated portion of the first surface of the web material, i.e. a margin portion to support the web material. Therefore, the position of the web material can be strictly kept so as to form a coated film with a uniform thickness.

The double side coating device according to the present invention may further has a static pressure pad that is placed to form a gap between with the web material and that is provided with a number of small holes from which gas is ejected toward the web material.

In accordance with this configuration, a portion of the web material stretched between the supporting portions can be supported by a pressure of gas so as to prevent the stretched portion from denting caused by the coating material ejecting pressure of the second coating head or by a weight of the coating material applied on the first surface. Therefore, the thickness of the coated film can be uniformed widthwise.

The double side coating device according to the present invention may further has a pair of vacuum conveyors that have a endless belt formed with a number of through holes and a vacuum chamber sucking the web material thorough the through holes, that contact with uncoated portions at the both side of the web material, and that placed so that a distance from each other downstream is longer than upstream.

In accordance with this configuration, the web material is stretched widthwise by the vacuum conveyors. Therefore, it can prevent the web material from getting winkle caused by the weight of the applied coating material.

In the double side coating device according to the present invention, the first coating head may apply the coating material to the first surface of the web material in a form of a plurality of lines, and the supporting portion of the suction roller may also be provided at a position where the supporting portion sucks the portion between the coating material applied in the form of the plurality of the lines.

In accordance with this configuration, the coating device can form liner coated films in parallel on a wider web material. Therefore, a throughput can be increased.

According to the present invention, when coating of the second surface of the web material, the supporting portion sucks a uncoated margin portion of the web material to support the web material. Therefore, the web material does not oscillate so that a coated film can be formed at a uniformed thickness. Further, since the suction roller does not contact with the coated film on the first surface, drying of the coated film on the first surface is not required before coating of the second surface. Accordingly, an installation space is small and energy consumption is small.

DETAILED DESCRIPTION OF THE PREFERRED EMBODIMENT

Figure 1:
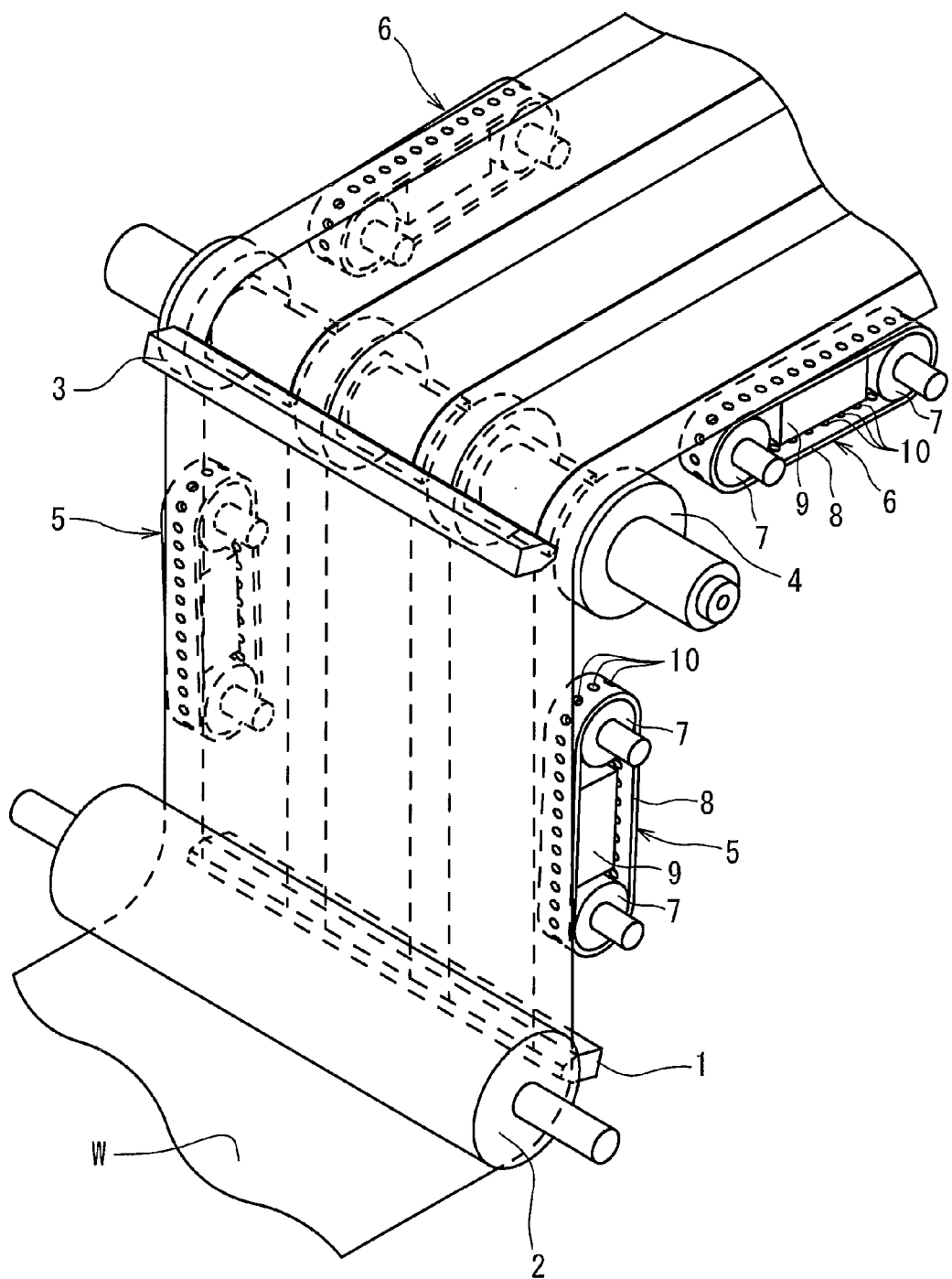
FIG. 1 is a partial perspective view of a double side coating device as a first embodiment of the present invention.

Hereinafter, embodiments of the present invention will be described referring to the attached drawings. FIG. 1 shows a construction of a portion relating coating in a double side coating device as a first embodiment of the present invention. The double coating device of this embodiment has a first coating head (coating die) 1 that applies coating material in a form of three lines at even intervals on a first surface (back side) of a web material W, a back up roller 2 that supports a second surface of the web material W in a position opposite to the first coating head 1, a second coating head (coating die) 3 that applies coating material in a form of three lines on a second surface (front surface) so that the three lines corresponds to the coating material applied to the first surface in opposite side, and a suction roller 4 that supports the first surface of the web material W in a position opposite to the second coating head 3.

This double side coating devise further has pairs of vacuum conveyors 5, 6 that suck an uncoated portions (margin portion) on both side where is not coated on the first surface of the web material W and that is arranged so that a distance from each other downstream is longer than upstream, respectively between the back up roller 2 and the suction roller 4 and downstream of the suction roller 4.

The vacuum conveyors 5, 6 are respectively provided with a endless belt 8 stretched over two pulleys 7 and driven at a speed slightly higher than the conveying speed for the web material W, and a vacuum chamber 9 opening back side of the endless belt 8 and vacuumed its inner space. The endless belt 8 is formed with a number of through holes 10, and therefore the vacuum chamber sucks the web material coming close to the top face of the endless belt 8 through the through holes 10.

Pairs of the vacuum conveyors 5, 6 are respectively arranged so that one vacuum conveyor is inclined to the other one to make the distance between the two vacuum conveyors downstream longer than upstream. Therefore, the through holes 10 move so as to elongate the distance between portions of the web material 10 where are sucked by the through holes 10. The sucking force of the vacuum conveyors 5, 6 are an extent of that the web material W slips on the surface of the vacuum conveyors 5, when the tension of the web material is raised. Therefore, the web material upstream can also be applied with a tension widthwise by continuously widening the web material with the pairs of the vacuum conveyors 5, 6.

Figure 2:
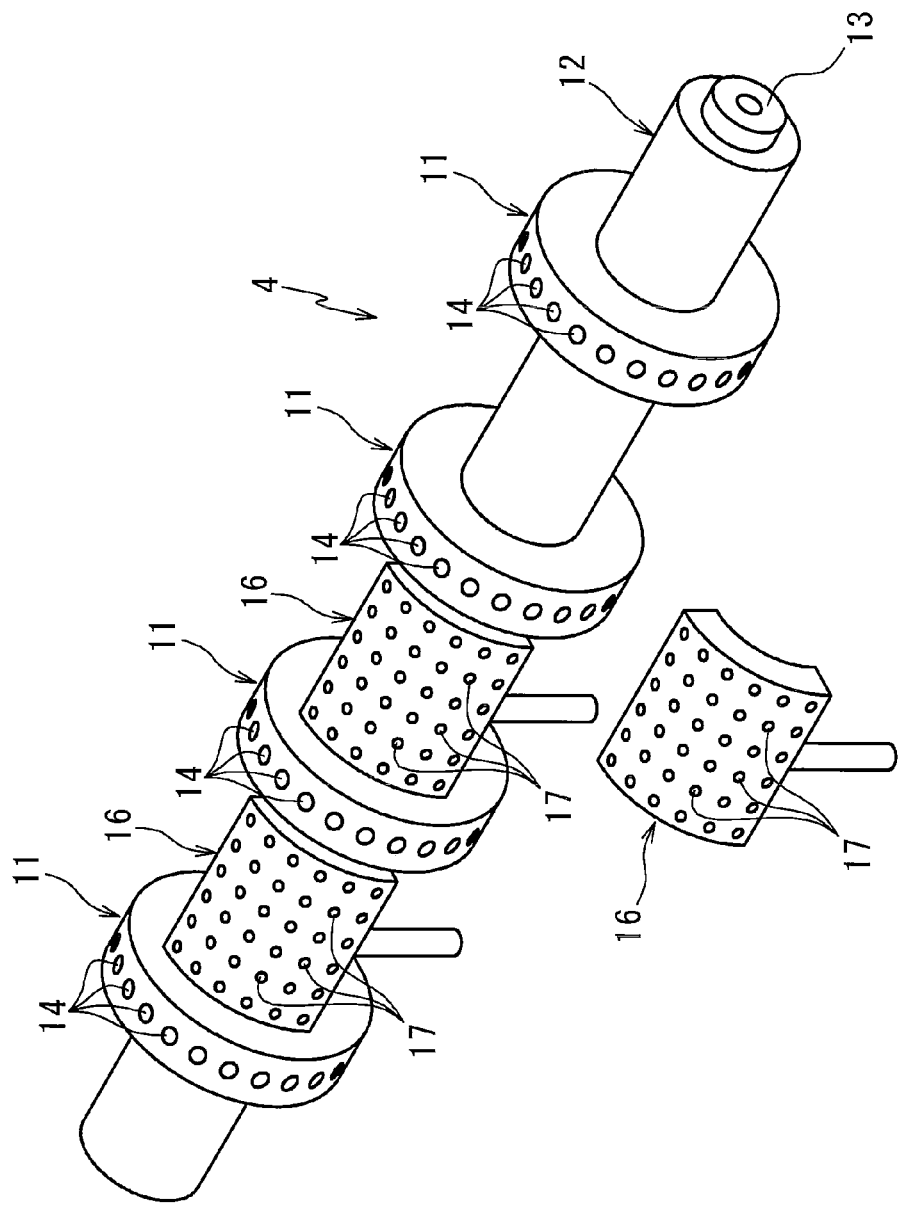
FIG. 2 is a perspective view of a suction roller of the double side coating device in the FIG. 1.

FIG. 2 shows the suction roller 4 in detail. The suction roller 4 is consist of an outer tube 12 provided with supporting portions 11 which respectively project annularly so as to contact with uncoated portions at the both sides of and between the coating materials linearly applied on the web material W, and with an inner tube 13 which is located inside of the outer tube 12 and one end of which is connected to an unshown vacuum source. The inner tube 13 is fixed and the outer tube 12 is driven by an unshown driving mechanism to revolve around the inner tube 13.

Figure 3:
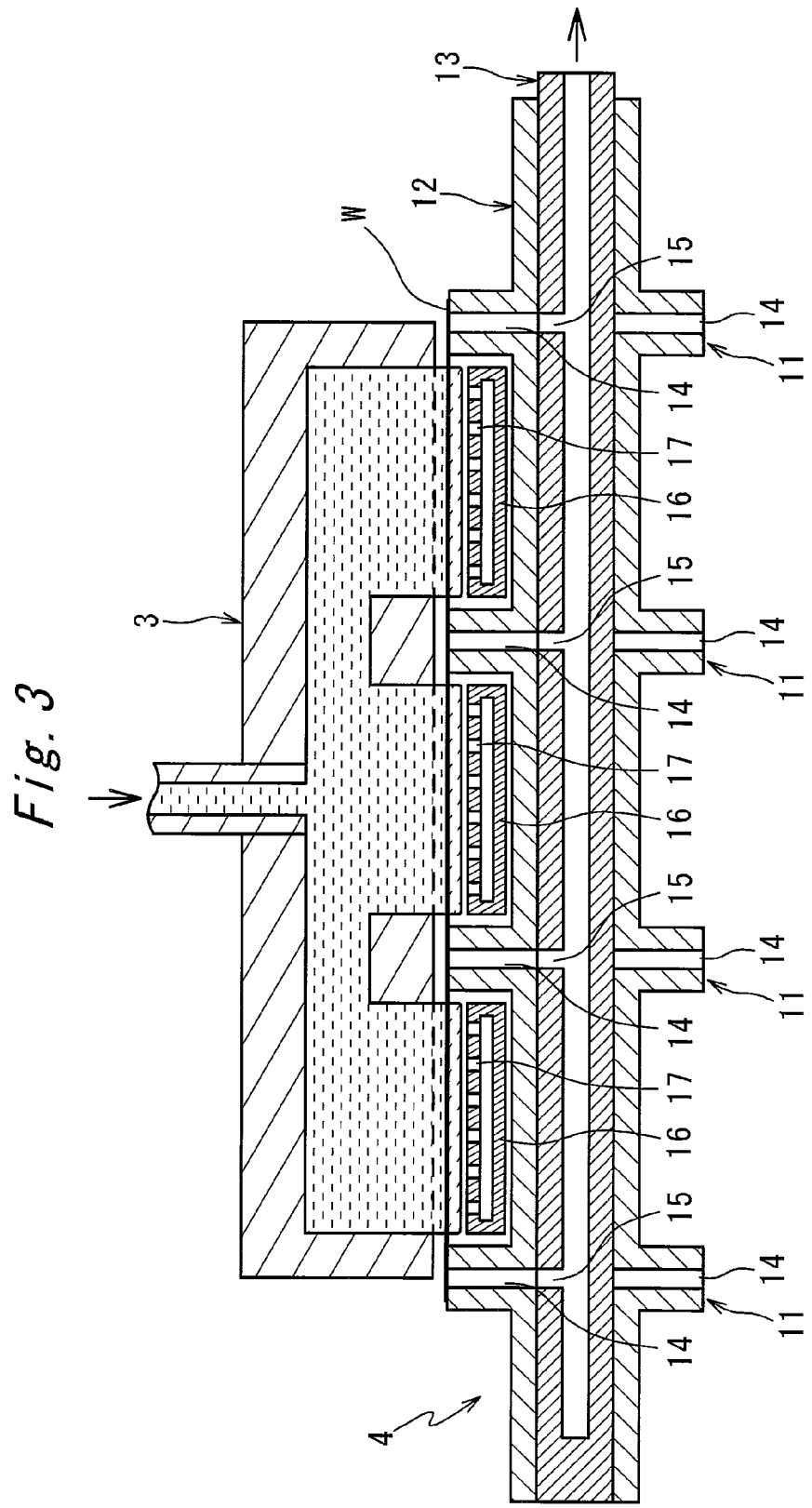
FIG. 3 is an axial sectional view of the suction roller and second coating head in the FIG. 2.
Figure 4:
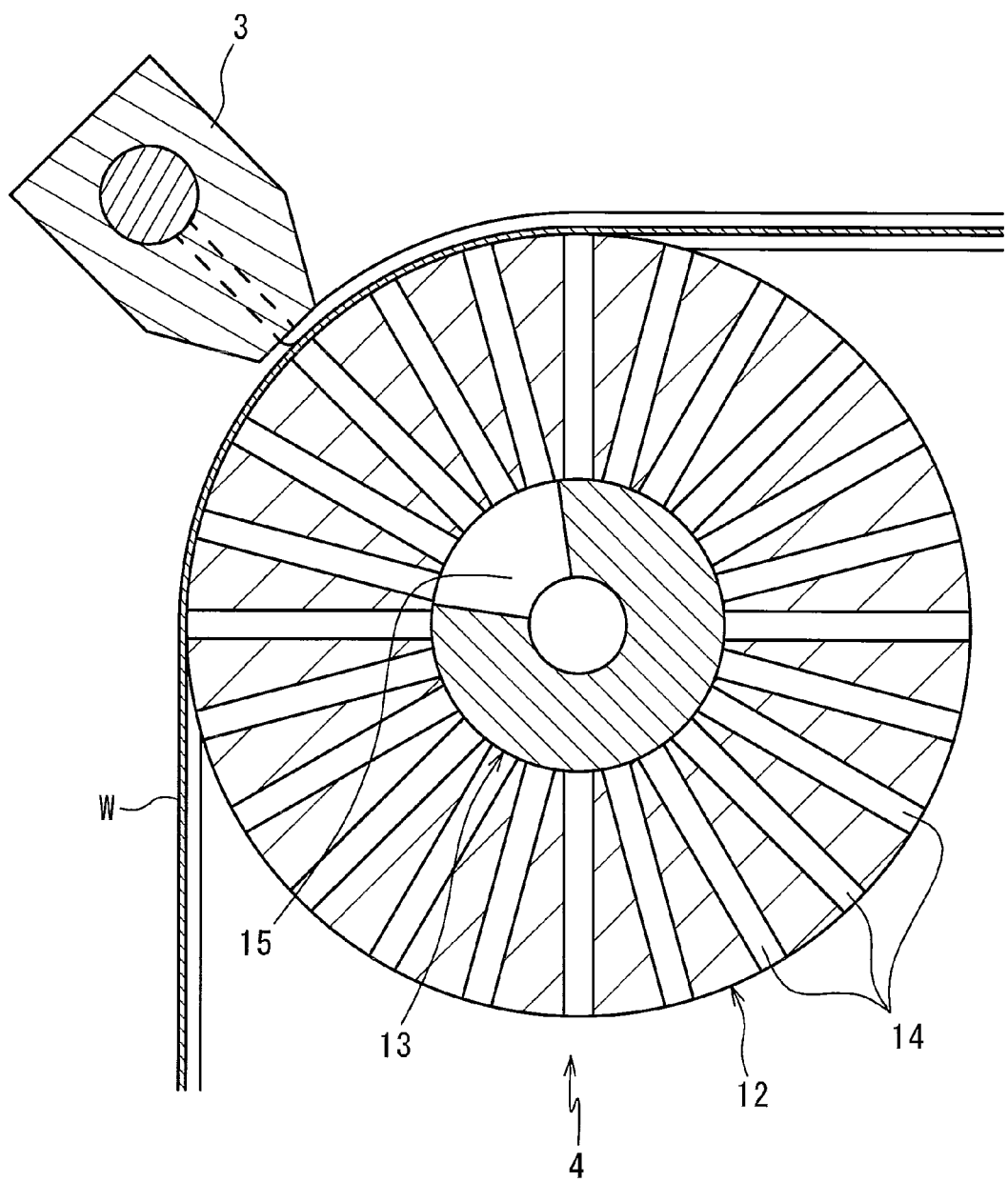
FIG. 4 is a radial sectional view of a supporting portion of the suction roller in FIG. 2.

As shown in FIG. 3 and FIG. 4, the supporting portion 11 of the suction roller 4 has a plurality of suction holes 14 penetrating to inside and opening in a regular pitch on its circumference so as to suck the atmosphere by communication of the suction holes 14 with the opening portion 15 of the inner tube. Thereby, the supporting portion 11 can suck the web material W to support it. It is noted that the opening portion 15 opens corresponding to a range of angle in which the supporting portion 11 has to suck the web material W, and therefore the other portion of the suction roller 4 interrupts the sucking thorough the suction holes 14 to release the web material W.

Furthermore, the double side coating device as this embodiment is provided with static pressure pads 16 which are respectively placed in concave portions between the supporting portions 11 of the suction roller 4 and which has a size substantially corresponding to the range of the angle for sucking of the web material W by the supporting portions 11.

Figure 5:
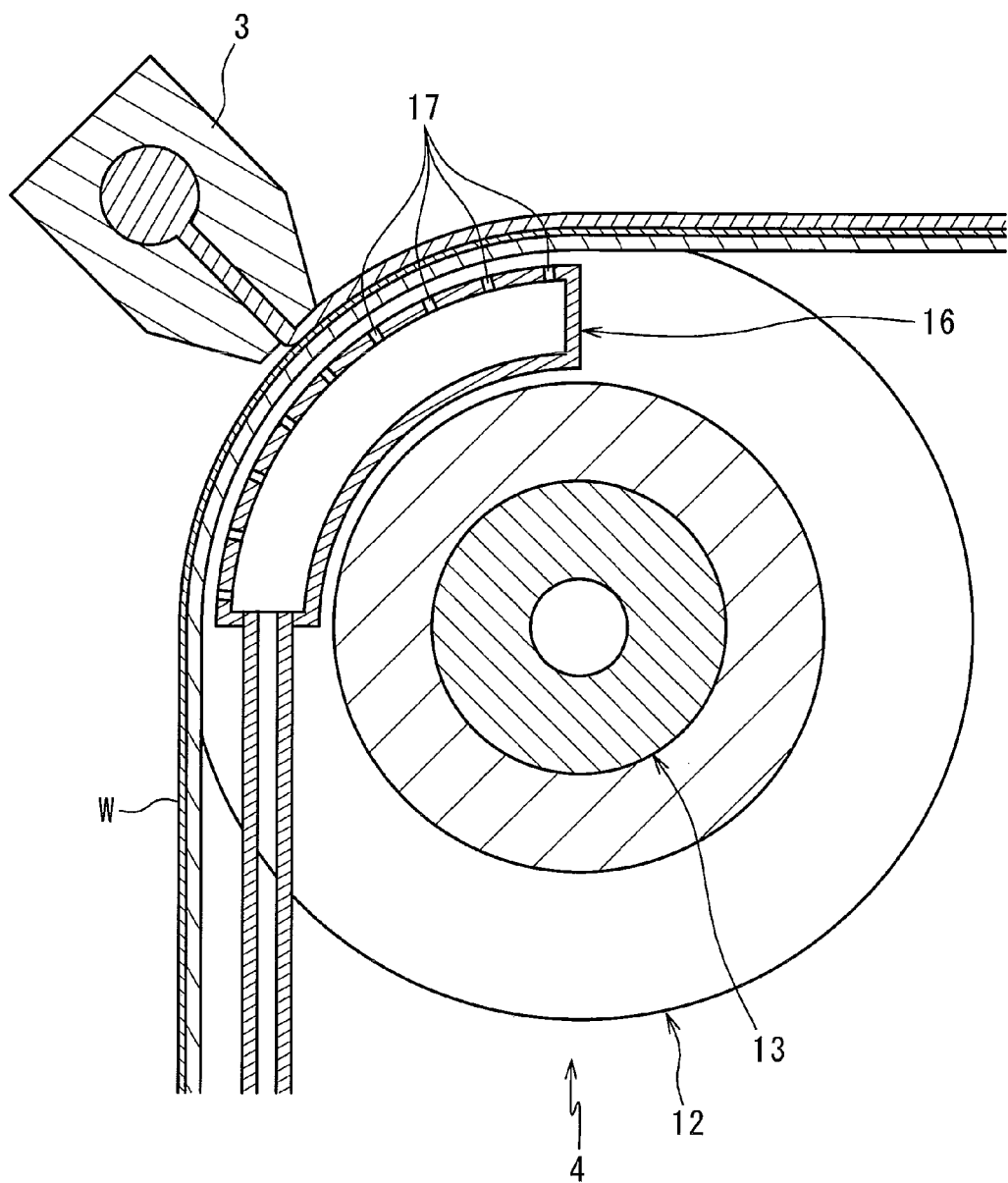
FIG. 5 is a radial sectional view of a portion of a static pressure pad of the suction roller in FIG. 2.

As shown in FIG. 5, the static pressure pad 16 is located inside of the outer surface of the supporting portion 11, has a hollow configuration with quarter cylindrical outer surface so as to form a gap between with the web material W being supported by suction of the supporting portions 11, and the static pressure pad 16 is provided with a number of small holes 17. The static pressure pad 16 is connected to unshown compressed air source so as to eject air from the small holes 17 toward the coated portion of the web material W.

The static pressure pad 16 supports the web material W in not bending state to the suction roller side, against weight of the coating material applied on the first surface of the web material W and discharging pressure of the coating material to be applied on the second surface of the web material W. Therefore, the air pressure of the static pressure pad 16 may be very low pressure, and should be a pressure that does not cause a troubled surface of the coating material applied on the first surface.

In this way, when the second coating head coats the second surface opposing the first surface coated by the first coating head 1 of the web material W, in the double side coating device of this embodiment, the suction rollers 4 suck the first surface of the web material W in contact with the outer surfaces of the supporting portions 11 to support the web material W. Therefore, the gap between the second surface of the web material W and the second coating head 3 is maintained in constant, and consequently the thickness of the coated film made by the second coating head 3 can be uniformly regulated.

Figure 6:
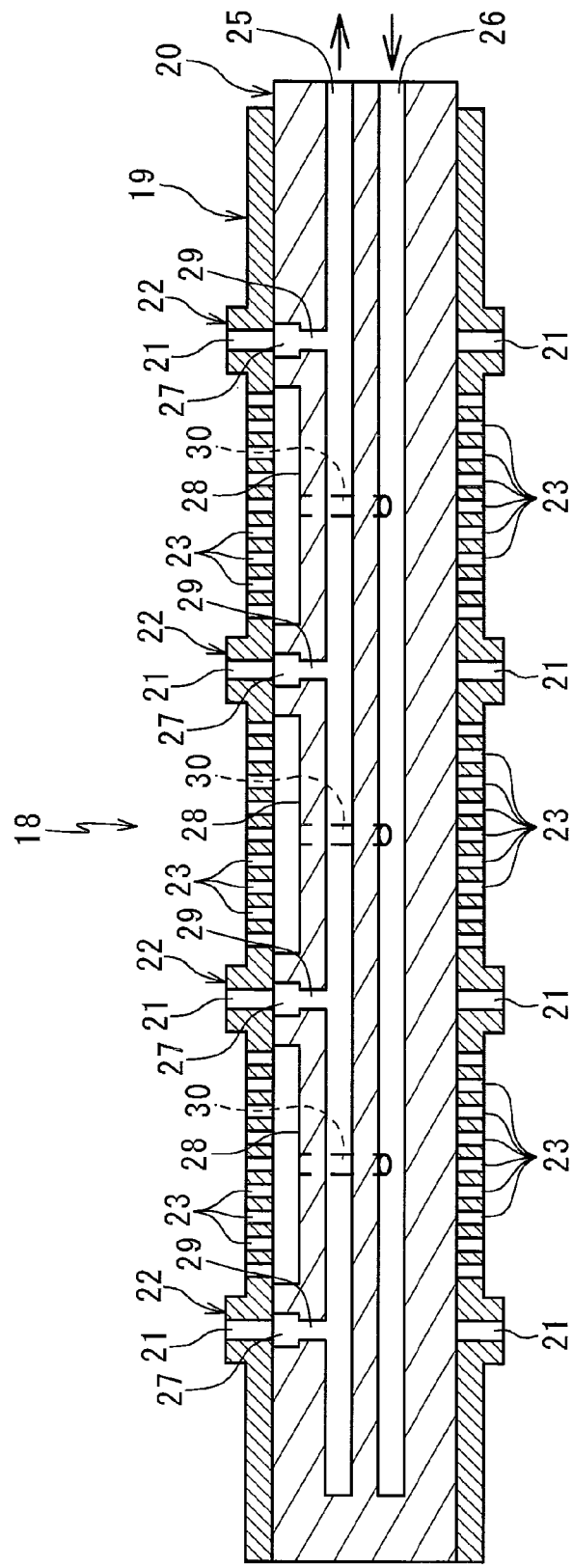
FIG. 6 is an axial sectional view of a suction roller of a double side coating device as a second embodiment of the present invention.
Figure 7:
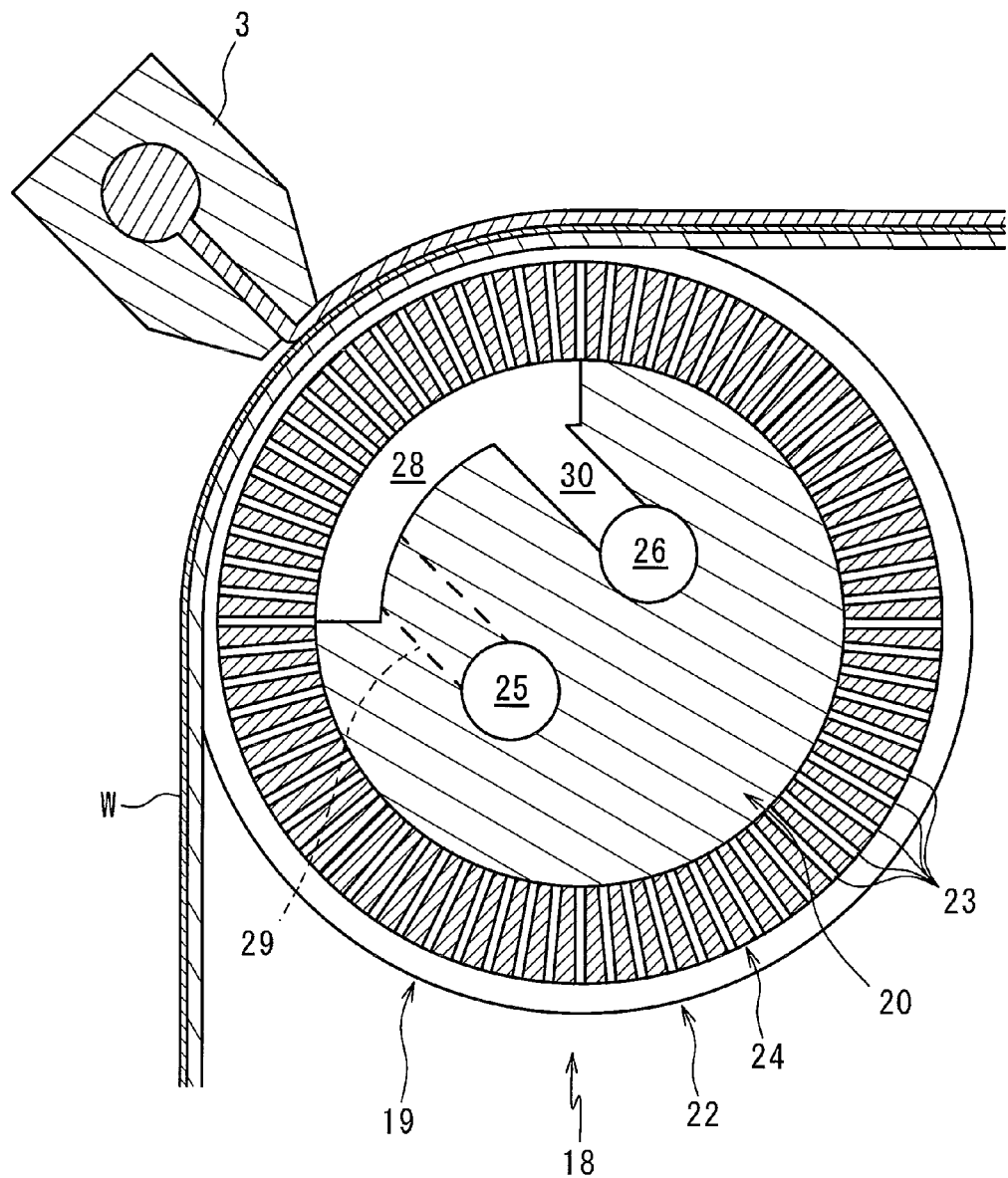
FIG. 7 is a radial sectional view of a portion of a static pressure pad of the suction roller in FIG. 6.

Next, FIGS. 6 and 7 show a suction roller 18 according to a double side coating device as a second embodiment of the present invention. This suction roller 18 consists of an outer tube 19 and an inner tube 20. The outer tube 19 has annularly projecting supporting portions with suction holes 21 opening radially on its circumference to suck the uncoated portions of the web material W, and static pressure pad portions 24 provided between the supporting portions 22 with a number of small holes 23 opening over all outer face.

In the inner tube 22, two flow channels extending parallel in the axial direction are formed. One flow channel is a suction header channel 25 to be connected to unshown vacuum source, and the other is a pressure header channel 26 to be connected to unshown compressed air source. The inner tube 20 is formed with connecting grooves 27, 28 separated from each other in range of 90 degree in a position respectively opposing to the supporting portions and static pressure pad portions 24 outside, and communicating holes 29 connecting the suction header flow channel 25 to the connecting groove 27 and communicating holes 30 connecting the pressure header flow channel 26 to the connecting groove 28.

In accordance with the above construction, the suction roller 18 sucks atmosphere through the suction holes 21 to suck the uncoated portion of the web material W on it outer surface of the supporting portions 22, and ejects air from the small holes 23 on the static pressure pad portions 24 to prevent the web material W bending.

| | | | |
|---|---|---|---|
| 1 | first coating head | 2 | back up roller |
| 3 | second coating head | 4 | suction roller |
| 5, 6 | vacuum conveyor | 8 | endless belt |
| 9 | vacuum chamber | 10 | through hole |
| 11 | supporting portion | 14 | suction hole |
| 16 | static pressure pad | 17 | small hole |
| 18 | suction roller | 21 | suction hole |
| 22 | supporting portion | 23 | small hole |
| 24 | static pressure pad portion | | |
| W | web material | | |

What is claimed is:

1. A double side coating device having
    a back up roller supporting a web material,
    a first coating head that is placed opposite to the back up roller and that applies a coating material onto a first surface of the web material,
    a suction roller that is provided with a plurality of supporting portions which projects annularly so as to contact with an uncoated portion of the first surface of the web material and on circumference of which suction holes are opened to suck atmosphere, and
    a second coating head that is placed opposite to the suction roller and that coats second surface of the web material with a coating material,
    wherein, the suction roller comprises an outer tube and an inner tube inserted inside the outer tube,
    the outer tube comprises the plurality of supporting portions and static pressure pad portions provided between the supporting portions with a number of small holes opened,
    the inner tube is formed inside with a suction header channel to be connected to a vacuum source and a pressure header channel connected to a compressed air source which are extending parallel in an axial direction,
    the inner tube is formed outside with suction connecting grooves and pressure connecting grooves separated from each other in a predetermined range in a position respectively opposing to the supporting portions and static pressure pad portions, and
    the inner tube is formed with suction communicating holes connecting the suction header flow channel to the suction connecting grooves and pressure communicating holes connecting the pressure header flow channel to the pressure connecting grooves.

2. The double side coating device according to the claim 1 further having a static pressure pad that is placed to form a gap between with the web material and that is provided with a number of small holes from which gas is ejected toward the web material.

3. The double side coating device according to the claim 1 further having a pair of vacuum conveyors that have an endless belt formed with a number of through holes and a vacuum chamber sucking the web material thorough the through holes, that contact with uncoated portions at the both side of the web material, and that placed so that a distance from each other downstream is longer than upstream.

4. The double side coating device according to the claim 1, wherein
    the first coating head applies the coating material to the first surface of the web material in a form of a plurality of lines, and
    the supporting portion of the suction roller also is provided at a position where the supporting portion sucks the portion between the coating material applied in the form of the plurality of the lines.

* * * * *